United States Patent [19]

Jones

[11] 4,075,889
[45] Feb. 28, 1978

[54] RECORDER FOR MEASURING MOVEMENT OF RAILROAD TRACK RAILS UNDER LOAD

[76] Inventor: Paul T. Jones, 505 Dover Ave., LaGrange Park, Ill. 60525

[21] Appl. No.: 735,404

[22] Filed: Oct. 26, 1976

[51] Int. Cl.² .............................................. G01L 5/20
[52] U.S. Cl. ..................................................... 73/146
[58] Field of Search ..................... 73/146; 33/144, 146

[56] References Cited

U.S. PATENT DOCUMENTS

| 1,246 | 4/1873 | Morgan-Brown | 73/146 |
| 1,395,105 | 10/1921 | Harper | 33/144 |
| 3,705,531 | 12/1972 | Wandrisco | 73/146 |

Primary Examiner—Donald O. Woodiel

[57] ABSTRACT

Apparatus for measuring and recording the maximum lateral movement between rails of a railroad track from a non-loaded condition to a loaded condition caused by a moving train. The apparatus includes means for securing a recorder to opposite rails at a selected site intermediate adjoining track ties of a railroad track bed. The recorder is attached to opposite rails by elongate nonextensible connectors arranged to be situate intermediate the rails and is provided with a first visual indicator adapted to be set to show a no load track condition and a second visual indicator that shows maximum displacement therefrom under conditions of a moving train load.

10 Claims, 6 Drawing Figures

RECORDER FOR MEASURING MOVEMENT OF RAILROAD TRACK RAILS UNDER LOAD

Field of the Invention

The apparatus of the invention relates to a mechanically actuated visual recorder secured by connectors to opposing rails of a railroad track adapted to measure and record the maximum lateral movement between rails of a railroad track, from a normal no load track condition to the loaded condition under a moving train.

Background of the Invention

The "gauge" of a railroad track is accepted as being the distance between the inner sides of two parallel railroad rails measured at a point ⅝ inch below the top surface of opposing rails. The American standard gauge which is used in most countries of the world is 4 feet –8½ inches (1.435 meter). Past practice by track crews has consisted of measuring the track gauge under no load condition such as by using a rod gauge with terminal measuring ends adapted to touch the insides of opposite rails at a point ⅝ inch below the top surface.

Railroad tracks need to be maintained and adjusted to the standard gauge in order to safety carry modern high speed train loads. In recent years the advent of heavier car loads, multi-axle locomotives and unit trains, has caused an increase in the normal problems of maintaining railroad track to conform to the standard rail gauge. Because of modern train operating practices and minimal track maintenances programs on many U.S. railroads, the Federal Railroad Administration has ordered maximum and minimum allowable tolerances of track gauge for six classes of standard track. The F.R.A. has stipulated that the track gauge is to be measured under the load conditions of a moving train.

The instant invention is simple and can be economically manufactured. As a consequence, a plurality of the track gauge recorders of the invention can be readily attached at selected locations spaced along a track to monitor a track section suspected of being out of tolerance under moving train loads. For example, a series of recorders can be attached to the rails at 10 foot intervals for several hundred feet. Curved track sections might be monitored by attaching the gauge recorder units at shorter distances around the curve.

Gauges and instruments for measuring track conditions under load are known, such as disclosed in U.S. Pat. Nos. 3,705,531 Wandrisco, 3,234,777 Joy, 2,408,553 Gieskieng, 1,984,318 Reichard, 1,415,287 Wooster. These patents disclose complicated means for measuring performance of a train, measuring wheel loads, measuring the thrust on a rail at switch points and downward deflection of a single rail member.

It is an object of the invention to provide an inexpensive readily applied recorder for measuring the relative movement of the rails of a railroad track under a moving train load.

Another object is to provide a device to visually record the maximum spread of opposite rails of a railroad track from a no load condition to a loaded condition typically caused by a moving train.

Summary of the Invention

The invention broadly relates to an apparatus for recording relative movement under load between opposing rails of a railroad track comprising:
body means disposed between said opposing rails; and
means for attaching said body means to each of said rails;
said body means including displacement indicia to show extent of movement from normal no load position of said rails.

Referring now to the drawing wherein:

FIG. 1 is a cross sectional view of a typical railroad track bed taken along a line perpendicular to the track center line and intermediate two ties, showing one embodiment of the invention secured to the two rails of the track, FIG. 2 is an enlarged half sectional side view of one embodiment of the gauge change recorder of the invention showing the apparatus set in unloaded condition, FIG. 3 is a view similar to FIG. 2 showing the recorder and disc indicators in extended position under a typical train load, FIG. 4 is a view similar to FIG. 2 showing the recorder returned to initial unloaded condition and the disc indicators at their extended positions, FIG. 5 is a cross sectional view of an alternate embodiment of the recorder set in unloaded condition, and FIG. 6 is a view similar to FIG. 5 showing the recorder in extended position.

Detailed Description

Figure 1:
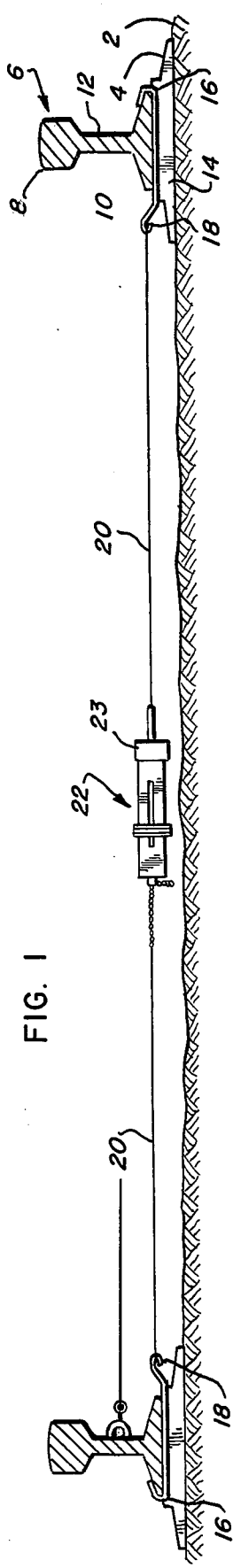
Figure 3:
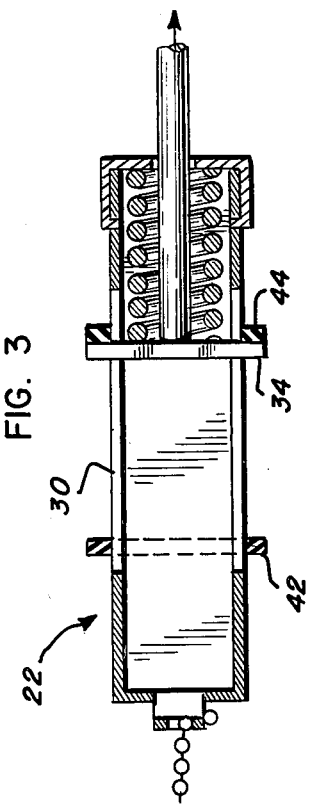
Figure 2:
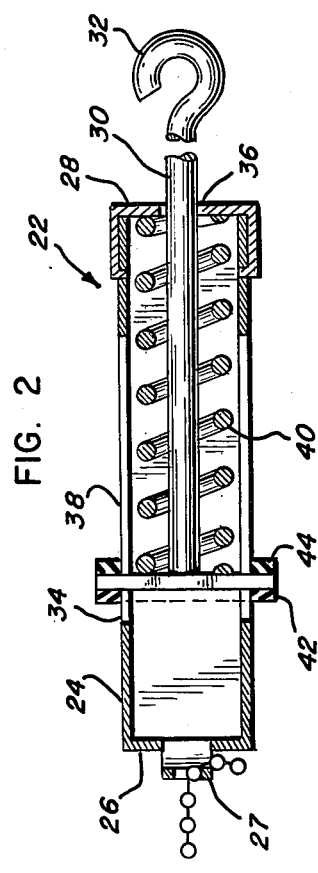
Figure 4:
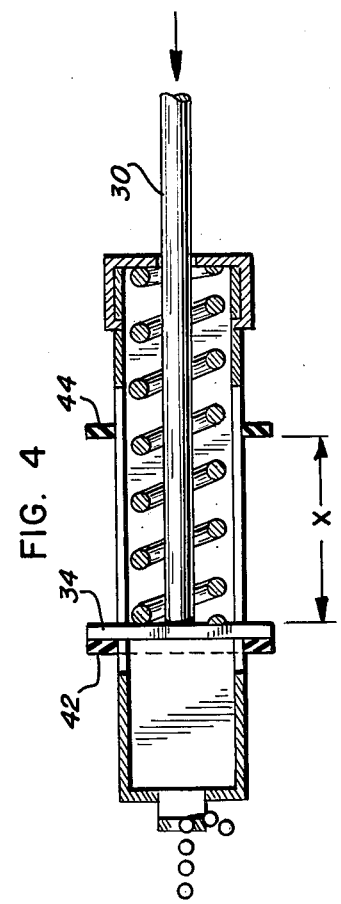

Referring to the drawing, FIG. 1 shows a cross sectional view of a typical railroad roadbed taken along a plane intermediate spaced apart ties 2. Rails 6 are mounted on tie plates 4 and spiked to the ties 2 in the conventional manner. The rails are of a standard type having a head portion 8, base flange 10 and web 12. A rail clamp 14 is formed of metal or plastic shaped and suitably sized to be releasably secured to rail base flange 10 of both rail members 6 of the track. The outboard ends 16 of clamps 14 are preferably provided with hook portions to fit and engage the rail base flanges 10. The inboard end 18 of each clamp 14 is provided with a hook or aperture to secure thereto a first end of a nonextensible flexible elongate connector member 20 such as a length of chain, bead chain, wire rope or the like (FIGS. 2, 3, 4). The second end of connector 20 is adapted to be adjustably secured to the body 24 of gauge recorder 22 such as by a chain-link receptacle 27, clamp, fastener or the like.

In one embodiment of the invention, body 24 is comprised of a tubular housing 24 fitted with a first or slide rod end 28 and a second or blind end 26. It is to be understood that tubular housing 24 can be any shape of tubular polygon such as a circle, square, hexagon, etc. Pull rod 30 is provided at one end with connector loop 32 and at its other end with crosshead tongue 34. Pull rod 30 is loosely fitted in slide mounting 36 of the housing rod end 28. The housing 24 is provided with opposed slotted apertures 38 adapted to loosely guide the extended ends of tongue 34 therein. A resilient member such as compression coil spring 40 is biased between slide mounting 36 and tongue blades 34. Alternatively a resilient tension member such as a coil spring can be biased between tongue blades 34 and the second or blind end of housing 24. Indicator discs 42, 44 are snugly slidably fitted on the exterior surface of housing 24. The fit of the bore of discs 42, 44 on the housing 24 of recorder 22 is important. A snug sliding fit is provided enabling each disc to be moved along the housing, but upon removal of the moving force the disc is adapted to remain on the housing situate at the moved position.

Figure 5:
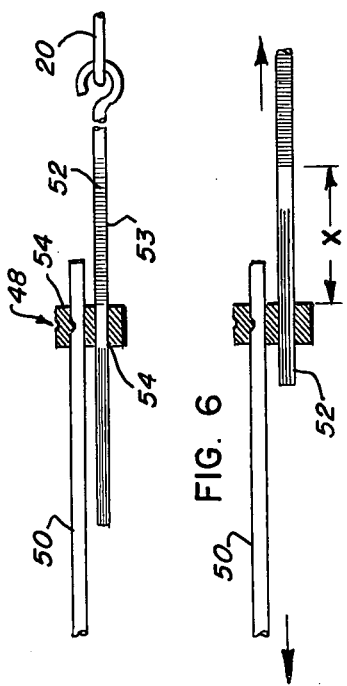
Figure 6:
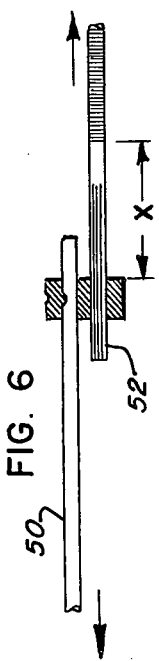

An alternate embodiment is shown in FIGS. 5, 6 wherein the recorder body 48 is comprised of a rigid slide block 56. As shown in FIG. 5 an extended fastening such as connector rod 50 is fixedly secured or anchored to slide block 56, as by a press fit or by staking or cementing. Slide block 54 can be metal, plastic or the like. Indicator rod 52 is provided with a preset marked portion such as in a white color 53, and an extended portion such as in a red color 54. Graduation markings might also be applied to indicator rod 52.

Method of Using the Gauge Indicator

As noted above the standard track gauge is 4 feet -8½ inches (1.435 meter) when measured inside the respective rail heads 8 of the track. The gauge of the track can be measured at that track station and logged for a serial number indicia 23 assigned to that particular recorder 22.

There is a direct correlation between measurement of gauge at a point ⅝ inch below the rail top and measurement of maximum movement under a moving train taken between the rails base flanges. This means that a no load measurement of the distance between opposed rail base flanges can be compared with the maximum train load measurement between opposed rail base flanges, and thereby provide a direct correlation to the change of the gauge at the rail head.

Typically, the embodiment of FIGS. 2, 3, 4 is secured to the base flange 10 of each rail, by securing clamp 14 thereto. Connector means 20 and housing 24 of recorder gauge unit 22 are secured and tightened between clamps 14 to provide a slight compression of spring 40. Slidable disc 42 and slidable disc 44 are moved along housing 24 to contact the blades of tongue 34. The recorder at that track station is now preset in unloaded condition.

When a train passes that station of the track, the dynamic loading of the train and condition of the track may cause the rails to spread apart. The gauge distance is increased and spreading of the rails causes clamps 16 and connecting means 20 to extend rod 30 thereby compressing spring 40, moving tongue 34 and extension indicator disc 44 along housing 24 to an extended position (FIG. 3) spaced from indicator 42. As the loading on the rails is removed by movement of the train, spring 40 returns rod 30 and tongue 34 to the unloaded position (FIG. 4) leaving disc 44 to indicate its maximum extended position, a distance X from indicator 42, thus recording the maximum spreading of the rail gauge from the unloaded condition. As the locomotive or other heavy car wheel loads successively pass the gauge indicator station, the observed strain of the rails will reflect the dynamic stresses imposed thereon. The pull rod 30 of the gauge 22 at the indicator station will be successively extended and retracted according to the strain on the rails. In each extension of rod 30, tongue 34 is extended to a position equal to maximum rail movement of the passing train load. Thus a previously positioned disc 44 can be further extended from disc 42 by a greater rail spread and the maximum rail spread from a preset gauge position can be recorded for later measuring. It will be understood that the described embodiment of the invention will indicate either outward or inward relative movement of the rails.

The alternate embodiment shown in FIGS. 5, 6 is secured by connectors 20 to each rail and to recorder body 48 comprising rigid block 54 in a manner similar to that described above.

In this embodiment it is desirable that a portion of at least one of the connector members 20 be of a material that is flexibly nonextensible such as for example wire rope. This is desirable to prevent movement of the recording means after establishing maximum spread of the rail gauge as described below.

Anchored connector rod 50 is connected to one rail by adjustably tightening connector 20. A first end of indicator rod 52 is engaged in a tight sliding fit in block 54 and the second or outer end is connected to the opposite rail to provide a tautly rigged connection between the opposing rails. A no load preset condition measurement is made of the distance between color code 53 on indicator rod 52 and the block 54. When the rails spread from an imposed train load, rod 52 is slid through block 54 to an extended position. As the load is removed, indicator rod 52 remains in extended position and thus the extent of movement from the no load condition can be observed. It will be appreciated that this embodiment indicates the extent of spread between rails only, and cannot indicate relative inward movement between rails.

Alternative forms of the invention described are contemplated and considered to fall within the scope of the present invention.

For example, it is contemplated that instead of using hooks that attach to the base portions of each of the rails of a track, the connecting means can alternatively be in the form of alnico or similar permanent magnet members which can readily attach to the webs of opposing rails of a track.

In the invention as thus far described, the recorder assembly is rigged clear and unobstructed to provide the connection from one rail to the opposing rail. However, it is contemplated that this invention can be rigged about obstructions and used in track sections under switches or the like or where obstructions such as track guard rails, may be interposed between the opposing rails of the track. In such case, the connectors of the assembly need merely be rigged under such obstruction, or over it in case it is not a rail on which a wheel will pass. The same function will occur, irrespective of the rigging of the assembly.

It is further contemplated that clamps 14 may have inboard ends 18 formed upwardly to enable connectors 20 to extend above ballast that might be disposed on the track bed.

Although two connectors are illustrated in the drawings, it is contemplated that one connector 20 would suffice, with one end of the recorder 22 being connected directly to a clamp 14.

Since opposite rails of a track are usually used to carry control and regulating electrical circuits, to avoid disruption of such circuits, an insulating means must be included in the apparatus and this can be provided at any of the components which form the assembly.

In its simplest form, the present invention would reside in a single cable extending between opposing rails, and upon displacement of the rails from normal position, the cable would break at a preselected point, to indicate the displacement of the rails under load. Such arrangement would have the disadvantage of providing no reading or measure of the extent of rail displacement.

Other forms of displacement indicia than those specifically described are contemplated. An arrangement whereby tongue member 34 serves to scribe or mark a chalked or greased or equivalent treated surface, would function well in some applications.

A still further form of indicia could be that of a potentiometer contact, whereby an actual electrical reading could be produced, this being proportional to the extent of displacement of the rails under load.

Alternative embodiments and modes of practicing the invention, but within its spirit and scope, will, in the light of this disclosure, occur to persons skilled in the art. It is intended, therefore, that this description be taken as illustrative only and not be construed in any limiting sense.

What is claimed is:

1. Apparatus for recording relative movement under load between opposing rails of a railroad track comprising,
   body means disposed between said opposing rails, and
   means for securing said body means to each of said rails in a manner to permit normal passage of a vehicle over the rails,
   said body means including displacement indicia means for showing maximum extent of relative movement of said opposing rails between no load condition and load condition created by the passing of a vehicle over said rails.

2. Apparatus as claimed in claim 1 wherein said means for attaching said body means comprises,
   a connector for each rail of a track, and
   at least one elongate non-extensible flexible member having one end secured to one end of said connector and the other end secured to one end of said body means.

3. Apparatus as claimed in claim 1 wherein said displacement indicia comprises a spring and a tongue disposed adjacent one end of said spring to indicate movement of said spring.

4. Apparatus as claimed in claim 3 wherein said displacement indicia further comprises a pair of indicia discs snugly slidably mounted on said body means on either side of said tongue to provide for displacing one disc to a point of maximum displacement of said tongue as a consequence of relative rail movement under load.

5. Apparatus as claimed in claim 1 wherein said displacement indicia comprises,
   one elongate member immovably secured in said body means, and
   a second elongate member snugly slidably secured in said body member,
   surface markings on said second elongate member to indicate extent of movement from normal no load position.

6. Apparatus as claimed in clam 2 wherein said connector comprises a rail clamp formed to engage the base portion of a rail.

7. Apparatus as claimed in claim 2 wherein said connector comprises a magnet member which attaches to the web portion of a rail.

8. Apparatus as claimed in claim 1 further comprising an electrical insulating member disposed at a predetermined location in the apparatus to prevent passage of electrical current from one rail to another.

9. Apparatus as claimed in claim 3 wherein said spring is a compression spring.

10. Apparatus as claimed in claim 3 wherein said spring is an extension spring.

* * * * *